United States Patent [19]
Schwarzl

[11] Patent Number: 5,100,521
[45] Date of Patent: Mar. 31, 1992

[54] PROCESS AND AN ARRANGEMENT FOR PREPARING OZONIC GASES AND SOLUTIONS

[75] Inventor: Karl Schwarzl, Mitterndorf-Traukirchen, Australia

[73] Assignee: Schmidding-Werke Wilhelm Schmidding GmbH & Co., Cologne, Fed. Rep. of Germany

[21] Appl. No.: 654,231

[22] Filed: Feb. 12, 1991

[30] Foreign Application Priority Data

Feb. 14, 1990 [AT] Austria ................................ 342/90

[51] Int. Cl.⁵ ........................... C02F 1/78; B01J 19/00
[52] U.S. Cl. ................................ 204/176; 422/186.12; 422/186.07; 422/186.11
[58] Field of Search ............ 422/186.07, 186.11, 422/186.09, 186.25, 187, 188, 190; 204/176

[56] References Cited

U.S. PATENT DOCUMENTS

| | | | |
|---|---|---|---|
| 2,812,861 | 11/1957 | Bickford | 210/120 |
| 3,663,418 | 5/1972 | Kawahata | 422/186.11 |
| 4,167,484 | 9/1979 | Morikawa | 250/533 |
| 4,430,306 | 2/1984 | Namba et al. | 422/292 |
| 4,462,965 | 7/1984 | Azuma et al. | 422/186.08 |

FOREIGN PATENT DOCUMENTS 1-297194 11/1989 Japan .
1200832 8/1970 United Kingdom ................. 171/23

Primary Examiner—Edward A. Miller
Assistant Examiner—Daniel J. Jenkins
Attorney, Agent, or Firm—Ostrolenk, Faber, Gerb & Soffen

[57] ABSTRACT

To produce an ozonic aqueous solution, optionally in addition to recovering a gas having an elevated ozone content, an aqueous solution is treated in an absorption vessel under pressure with an ozonic gas produced in an ozone generator by silent electrical discharge in air or oxygen the ozonic gas being compressed to a pressure of up to 10 bar before treating the solution therewith. An aqueous ozonic solution under pressure is decompressed into the ozonic gas prior to compressing the ozonic gas, wherein ozone is released into the ozonic gas thus forming a gas having an elevated ozone content (strong gas).

11 Claims, 2 Drawing Sheets

PROCESS AND AN ARRANGEMENT FOR PREPARING OZONIC GASES AND SOLUTIONS

BACKGROUND OF THE INVENTION

The invention relates to a process for the preparation of an ozonic aqueous solution, optionally in addition to recovering a gas having an elevated ozone content, wherein an aqueous solution is treated in an absorption vessel under pressure with an ozonic gas produced in an ozone generator by silent electrical discharge in air or oxygen and compressed to a pressure of up to 10 bar.

It is known that ozone is an excellent bleaching agent and disinfectant, the ozone preferably having to be available at a relatively high concentration in a gas mixture or in an aqueous solution if applied on a technical scale. Such ozone solutions are needed to an increasing extent, for instance, for bleaching cellulosic materials, for treating drinking water and for oxidizing purposes in the chemical industry.

However, no satisfactory solutions have, so far, been brought to the large-scale preparation of higher concentrated ozonic solutions and gases. This holds, in particular, for the preparation of aqueous solutions having ozone contents of above 200 g $O_3/m^3$ water and gases containing more than 160 g $O_3/Nm^3$ gas.

When producing ozone by the silent electrical discharge in air, the energy consumption will increase considerably if a high concentration of ozone is to be reached. Therefore, it is sought for reasons of expenditure to operate the ozone generator in the energy-saving range, which, on the other hand, involves an increased use of oxygen, again incurring elevated costs. Attempts have been made to oppose this by recycling into the ozone generator excess oxygen that has not been reacted. To this end, the oxygen must be dry and free of impurities. Purification may, however, involve difficulties if the oxygen contains impurities derived from the reaction of ozone with the medium to be treated. For this reason, processes have been sought to effect the upgrading of ozone in gas, because in such a case the oxygen might be recycled before getting impurified.

According to a known process, it is operated with adsorption masses capable of binding ozone and releasing it later on in high concentrations. The oxygen freed of ozone may be reused. According to another process, ozone is adsorbed from oxygen and then desorbed into a nitrogen atmosphere. None of these processes has been successful in large-scale operation, the problems of a high oxygen consumption or a high energy consumption in the ozonizer still being unsolved.

DESCRIPTION OF THE PRIOR ART

A process of the initially defined kind is described in Austrian patent application A 2927/89. According to that process, the ozonic gas produced in the ozone generator is compressed, is dissolved into an aqueous medium, and the ozone solution obtained is used for bleaching cellulosic materials. Unreacted gas may be recycled into the ozonizer. However, in order to reach higher ozone concentrations (strong water), it is necessary to operate at temperatures below room temperature. Moreover, the crude gas produced in the ozonizer is to have an ozone content of above 100 g $O_3/Nm^3$, which raises the energy consumption of the ozone generator accordingly.

SUMMARY OF THE INVENTION

It is the aim of the invention to further improve this process, in particular, in order to obtain ozone solutions and ozonic gases having high contents of ozone in an economic way and on a large scale. The ozonizer should be operable in the energy-saving range, i.e., it should be possible to depart from crude gas containing less than 100 g $O_3/Nm^3$.

In accordance with the invention this object is achieved in a process of the initially defined kind in that an aqueous ozonic solution under pressure is decompressed into the ozonic gas prior to compressing the ozonic gas, wherein ozone is released into the ozonic gas thus forming a gas having an elevated ozone content (strong gas). In this manner, it is possible to depart from a crude gas having an ozone content of below 100 g $O_3/Nm^3$ and to obtain a strong gas of above 100 g $O_3/Nm^3$, nevertheless. By the process according to the invention, the preparation of strong water having an ozone content of more than 200 g $O_3/m^3$ is feasible at room temperature.

The pressurized aqueous ozonic solution used to introduce ozone into the weak gas preferably is taken from the absorption vessel and recycled into the absorption vessel after decompression.

It has proved that a strong gas having an ozone content of more than 160 g $O_3/Nm^3$ gas will be obtained in this manner, a preferred range extending from 160 to 180 g $O_3/Nm^3$ gas.

A further preferred embodiment of the process according to the invention consists in that the strong gas partially is introduced into the absorption vessel and partially is withdrawn from the production cycle and fed to direct applications, e.g., to bleaching.

The process according to the invention may as well be carried out in two stages, wherein the gas obtained from the ozone generator is divided into two partial streams, the first partial stream, after enrichment and compression as described above, being fed into a first absorption vessel for the absorption of ozone and the second partial stream, after compression, being fed into a second absorption vessel, a pressure being maintained in the first absorption vessel that is higher than in the second absorption vessel.

It is suitable to withdraw the aqueous solution formed in the second absorption vessel and decompress it into the first partial stream and to take the desired aqueous ozonic solution from the first absorption vessel. This two-stage embodiment allows for higher material outputs than the one-stage variant.

The process according to the invention even may be carried out in three stages, wherein the gas obtained from the ozone generator is divided into three partial streams and a first partial stream is conducted into a first absorption vessel after compression, the aqueous solution obtained is decompressed into the second partial stream, thus enriching the second partial stream with ozone, which second partial stream is then supplied to an additional absorption vessel. From this absorption vessel, the aqueous solution forming again is withdrawn and decompressed into the third partial stream, which, thus, also gets enriched with ozone. After this, the third enriched partial stream at least partially is conducted into a third absorption vessel and there is dissolved in water or in an aqueous solution to the desired ozone content, whereupon the desired ozonic solution is withdrawn from the third absorption vessel and may be supplied to its application.

The third partial stream enriched with ozone may, however, also be used directly, e.g., for bleaching purposes.

The invention also relates to an arrangement for carrying out the invention, comprising an ozone generator, at least one absorption vessel, in particular designed as an absorption column and flow-connected with the ozone-generator, and a drier, pump and ducts for connecting plant parts, which arrangement is characterized in that at least one pressure-releasing vessel is provided in the flow-connection between the ozone generator and the absorption vessel, which pressure releasing vessel is fed with ozone-containing water via a duct from the absorption vessel and is connected with the top of the absorption vessel via a return duct.

In a preferred embodiment of the arrangement according to the invention, the top of the absorption vessel is connected to the ozone generator via an oxygen duct and a drying means for recycling oxygen.

For the two-stage control of the process according to the invention, the arrangement is designed such that a branch duct leaves from the ozone duct to a second absorption vessel or column, which is connected with the pressure-releasing vessel via a duct and with the first absorption column via a gas duct, and that both a return duct to the top of the second absorption column and an ozone duct to the first absorption column are provided from the pressure-releasing vessel.

For the three-stage control of the process according to the invention, the arrangement is designed such that the ozone generator is flow-connected with three absorption vessels, one pressure-releasing vessel each being provided in the duct between ozone generator and first absorption vessel and in the duct between ozone generator and second absorption vessel.

Figure 1:
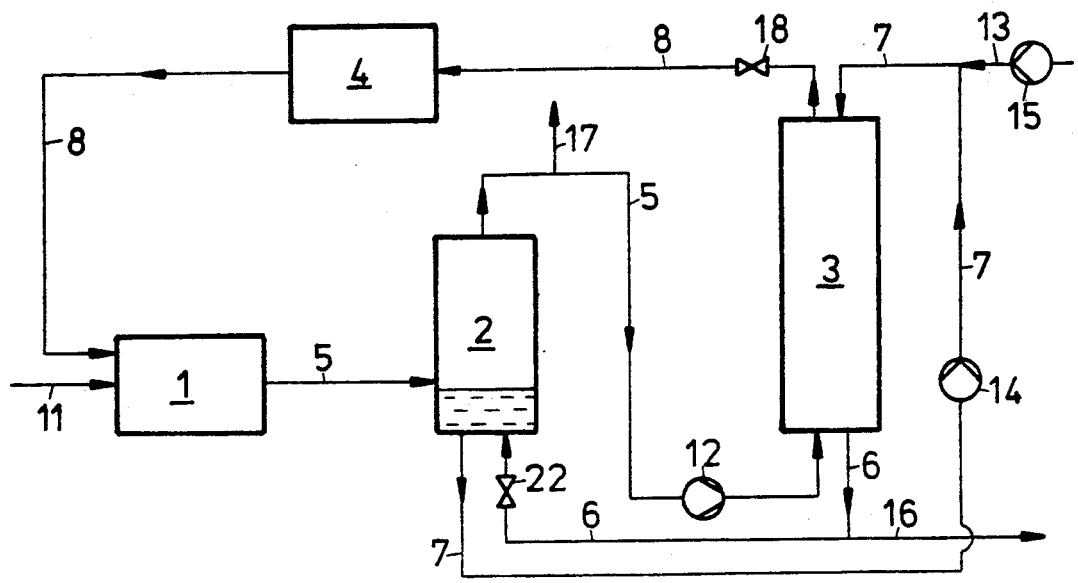
FIG. 1 shows a single stage embodiment of the process to produce an ozonic aqueous solution.

The invention will be explained in more detail in the following with reference to the drawing illustrating three embodiments in FIGS. 1, 2 and 3.

In FIG. 1, an ozone generator is denoted by 1, a pressure-releasing vessel is denoted by 2 and an absorption column is denoted by 3. The ozone generator 1 is fed (11) with air or oxygen, delivering weak gas having an ozone content of between 20 and 100 g $O_3/Nm^3$ gas via the ozone duct 5 to the absorption column 3. The pressure-releasing vessel 2 is connected into the ozone duct 5, strong water coming from the absorption column 3 at a pressure of between 2 and 10 bar being decompressed into the pressure-releasing vessel. Decompression is effected by valve 22. By being decompressed, the strong water releases part of its dissolved ozone into the weak gas such that a higher concentrated ozonic gas having an ozone content of between 100 and 180 g $O_3/Nm^3$ gas is obtained, which is compressed to a pressure of between 2 and 10 bar by a compressor 12 provided within the ozone duct 5 and is packed onto the absorption column 3 in that state. The top of the column 3 is fed (7) with ozone-containing recycled water from the pressure-releasing vessel 2, fresh water being feedable (13) into the return duct 7 as required. It goes without saying that pump means 14 and appropriate means 15 for feeding water at an elevated pressure must be provided in the return duct 7.

Within the absorption column 3, ozone is dissolved out of the gas into the water under pressure (2 to 10, preferably 6 to 8, bar), strong water having an ozone content of at least 200 g $O_3/m^3$ thus forming, which, for one part, is recycled into the pressure-releasing vessel 2 to deliver ozone—as already described above —, or which may be withdrawn (16) from duct 6 as the strong water produced according to the invention prior to decompression and used as such.

Strong gas having an ozone content of from 160 to 180 g $O_3/Nm^3$ gas can tapped (17) from the ozone duct 5 after the process according to the invention has been started.

If oxygen is used to produce ozone, the unreacted oxygen suitably is withdrawn from the top of the absorption column 3 through oxygen duct 8, is dried in the drier 4 and is returned to the ozone generator 1. A pressure drop within the absorption column 3 is prevented by valve 18.

Figure 2:
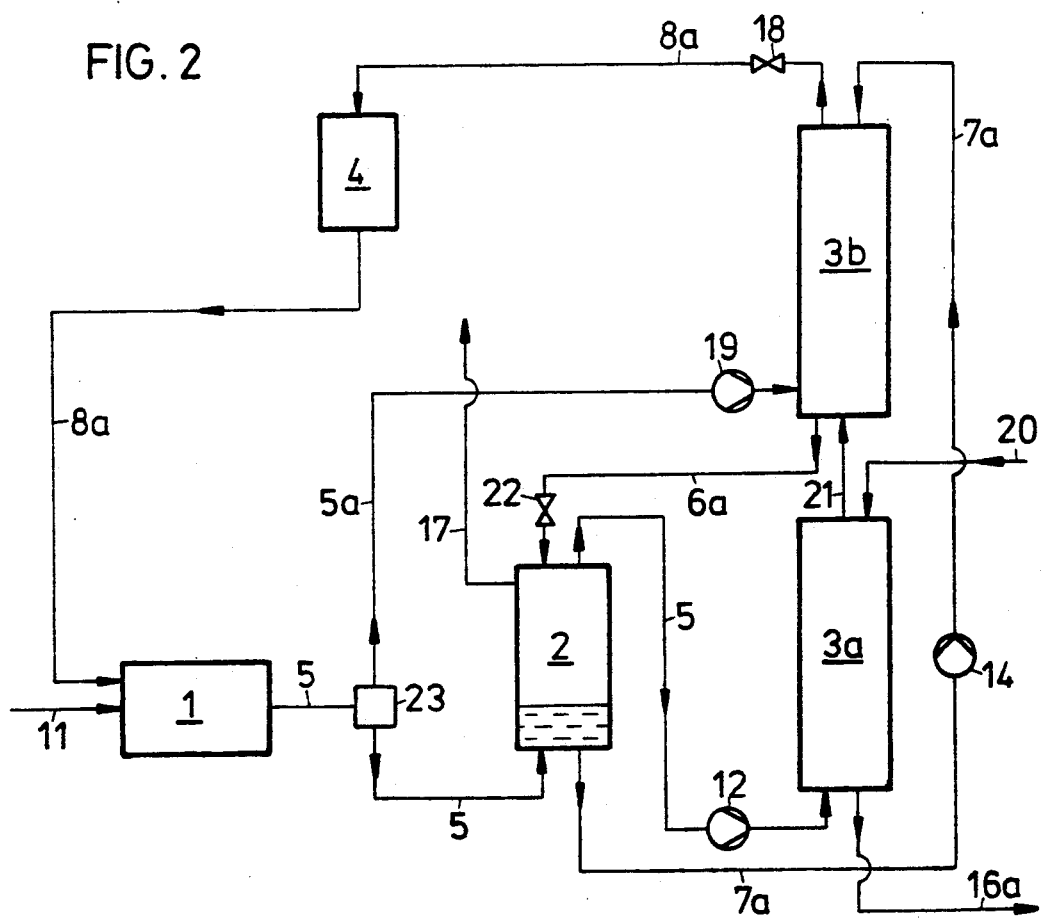
FIG. 2 shows a two stage embodiment of the process to produce an ozonic aqueous solution.

In FIG. 2, a two-stage embodiment of the process according to the invention is illustrated, in which the enrichment with ozone takes place in two absorption columns. At first, weak gas is conveyed from the ozone generator 1 into the absorption column 3a via the pressure-releasing vessel 2, as represented in FIG. 1. However, as in contrast to the embodiment depicted in FIG. 1, ozone-containing water is conducted into the pressure-releasing vessel 2 not from the absorption column 3a, but from an additional absorption column 3b via duct 6a. This ozone-containing water also is produced with weak gas from the ozone generator 1, which is tapped (5a) from the ozone duct 5 and is conducted into the absorption column 3b in the compressed state at a pressure of between 2 and 9 bar. An appropriate device 23 serves to branch off weak gas from the ozone duct 5. It has proved advantageous to branch off into the absorption column 3b about two thirds of the weak gas. The absorption column 3b is fed (7a) with recycle water from the pressure-releasing vessel 2, means for pumping and pressure increasing (not illustrated) being provided in the duct 7a for recycled water.

Strong gas is formed in the pressure-releasing vessel 2 in a manner analogous to FIG. 1 and is conducted into the absorption column 3a under a pressure of between 2 and 10 bar. It may, however, also be withdrawn from the production cycle by tapping (17) from the pressure-releasing vessel 2. The strong water produced according to the invention and having an ozone content of at least 200 g $O_3/m^3$ may be withdrawn (16a) from the absorption column 3a. Fresh water is introduced (20) into the production cycle on top of the absorption column 3a.

Unreacted oxygen and residual ozone from column 3a are injected into the sump of column 3b, wherein it is of decisive importance that the pressure within column 3a be adjusted higher than in column 3b.

Figure 3:
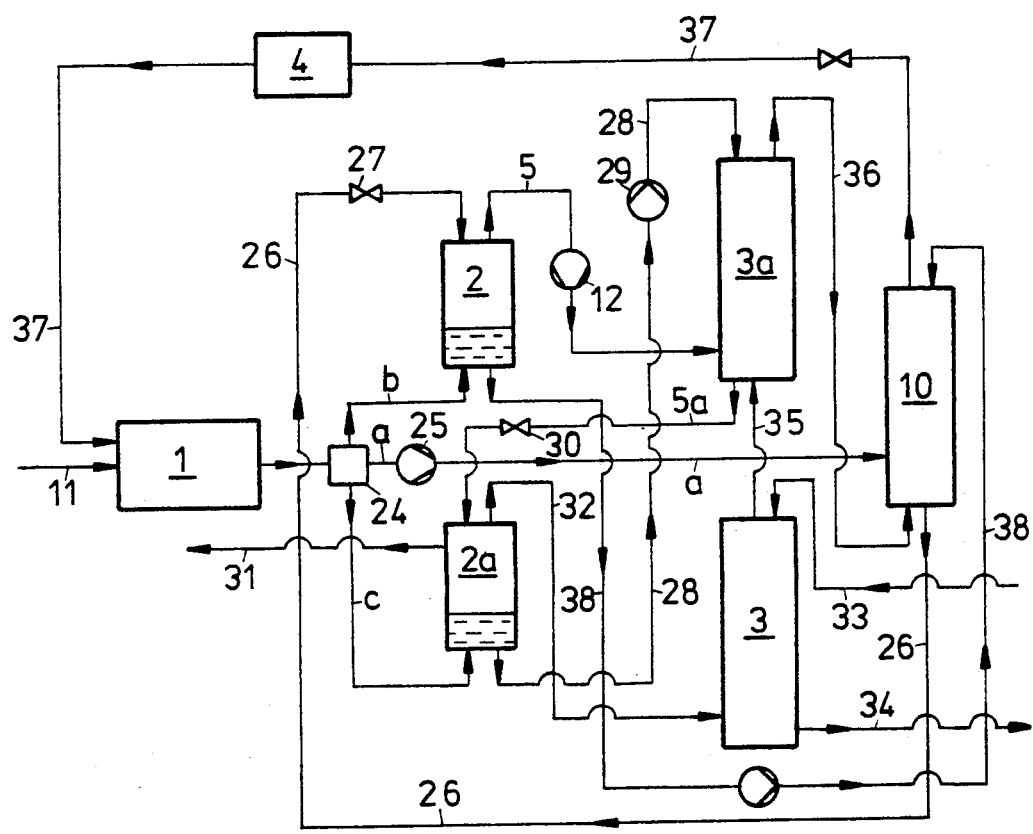
FIG. 3 shows a three stage embodiment of the process to produce an ozonic aqueous solution.

In FIG. 3, the three-stage embodiment of the process according to the invention is represented. Weak gas from the ozone generator 1 at first is divided into three partial streams by means of a suitable device 24. Reference letters a, b and c refer both to the partial streams and to the pertaining gas ducts in which the partial streams are conveyed to the other plant parts. Partial stream at first is compressed (25) and is treated under pressure in the absorption column 10 with recycled water from the pressure-releasing vessel 2, which is supplied to the absorption vessel 10 via duct 38; thus, a first ozonic solution is formed, which is withdrawn from the sump of the absorption column 10 and supplied (26) to the pressure-releasing vessel 2. Decompression is effected by valve 27. The pressure is released into the partial stream b, which thereby is enriched with ozone. The enriched partial stream is conducted (5) into column 3a and treated with recycled water from the pressure-releasing vessel 2a. Column 3a and pressure-releasing vessel 2a communicate with each other via a duct 28 for recycled water and a pump 29 for raising the pressure of the recycled water to an appropriate value.

The ozonic solution produced in column 3a is withdrawn via duct 5a and is decompressed into the pressure releasing vessel 2a via valve 30, ozone being delivered into the third partial stream c and strong gas having a high ozone content being formed. If this strong gas is to be used as such immediately, it may be removed from the pressure-releasing vessel 2a via discharge duct 31. For the production of aqueous solutions having high ozone contents, it is conducted (32) into column 3, in which the ozone is dissolved, for its major part, in water or in an aqueous solution fed (33) on top of the column 3 under pressure. The strong water formed may be removed from the production cycle via a strong water duct 34.

Columns 3 and 3a communicate via an oxygen duct 35 to recycle non-reacted oxygen from column 3 into column 3a, from there into column 10 through duct 36 and, further on, through duct 37 and via the drier 4 into the ozone generator 1. It will be evident to the skilled artisan that this oxygen recycling calls for the appropriate adjustment of the pressure conditions in columns 3, 3a and 10.

Respective ducts 28 and 38 are provided to convey recycled water from the pressure-releasing vessels 2a and 2 into columns 3a and 10 after the decompression stages.

The following exemplary embodiment serves to illustrate the one-stage variant of the process according to the invention in even more detail.

EXAMPLE

Crude gas from an ozone generator containing 90 g $O_3/Nm^3$ is supplied to a pressure-releasing vessel (116.7 $Nm^3$ gas/h; 10.5 kg $O_3/h$) A slight overpressure of 0.5 bar is adjusted within the pressure-releasing vessel.

At the same time, strong water coming from the absorption column and being under a pressure of 7 bar is decompressed into the pressure-releasing vessel (see farther below). Due to the release of pressure, part of the ozone dissolved in the absorption column under pressure is released again, thus enriching with ozone the crude gas coming from the ozone generator. The enriched crude gas is compressed to a pressure of 7 bar by a water ring pump and is supplied to the absorption column.

Water for the absorption of ozone is introduced into the absorption column on top (44 $m^3/h$, 25° C.). By controlling the circulating water, the gas mixture is adjusted to an ozone concentration of about 160 g $O_3/Nm^3$ gas in the pressure-releasing vessel. The circulating water is maintained at a temperature of 25° C.

The strong water to be taken from the column has an ozone content of at least 210 g $O_3/m^3$ and partially is decompressed into the pressure-releasing vessel as described above and partially is removed from the production cycle.

The excess oxygen, which may be enriched with water vapor and removed from the absorption column with a slight amount of ozone, is dried and recycled into the ozone generator.

What I claim is:

1. In a process for preparing an ozonic aqueous solution, comprising producing an ozonic gas in an ozone generator by silent electrical discharge in air or oxygen, compressing said ozonic gas to a pressure of up to 10 bar to form a pressurized ozonic gas, providing an aqueous solution in an absorption vessel, and treating said aqueous solution in said absorption vessel with said pressurized ozonic gas to form said ozonic aqueous solution, the improvement wherein a pressurized ozonic aqueous solution is decompressed into a second ozonic gas and combined with said ozonic gas prior to compressing said ozonic gas, thus elevating the ozone content, which after said second ozonic gas is combined therewith is called a strong gas.

2. A process as set forth in claim 1, wherein said ozonic aqueous solution is taken from said absorption vessel and is recycled into said absorption vessel after decompression.

3. A process as set forth in claim 1, wherein only a portion of said strong gas is introduced into said absorption vessel.

4. A process as set forth in claim 1 to be carried out in two stages by providing a first absorption vessel and a second absorption vessel and dividing said ozonic gas from said ozone generator into a first partial stream and a second partial stream, wherein said first partial stream is introduced into said first absorption vessel for ozone absorption and said second partial stream is compressed to form said pressurized ozonic gas and then introduced into said second absorption vessel after compression.

5. A process as set forth in claim 4, wherein an aqueous solution is formed in said second absorption vessel and is decompressed into said first partial stream, and wherein the desired ozonic aqueous solution is taken from said first absorption vessel.

6. A process as set forth in claim 1 to be carried out in three stages by providing a first absorption vessel, a second absorption vessel and a third absorption vessel and dividing said ozonic gas from said ozone generator into a first partial stream, a second partial stream and a third partial stream, wherein said first partial stream, after compression, is introduced into said first absorption vessel so as to obtain an aqueous solution, said aqueous solution is decompressed into said second partial stream so as to enrich said second partial stream with ozone, said second partial stream enriched with ozone is supplied to said second absorption vessel, aqueous solution is withdrawn from said second absorption vessel and decompressed into said third partial stream so as to enrich said third partial stream with ozone, said third partial stream enriched with ozone at least partially is introduced into said third absorption vessel, and the desired aqueous ozonic solution is withdrawn from said third absorption vessel.

7. In an arrangement for preparing an ozonic aqueous solution, by comprising means for producing an ozonic gas by decompressing an ozonic aqueous solution into said ozonic gas, means for compressing said ozonic gas, and means for treating said aqueous solution with said compressed ozonic gas, said arrangement including an ozone generator, at least one absorption vessel, flow-connection means adapted to flow-connect said at least one absorption vessel with said ozone generator, a drying means, pump means and duct means adapted to connect individual arrangement parts, the improvement comprising at least one pressure-releasing vessel provided in said flow-connection means between said ozone generator and said absorption vessel, duct means leading from said absorption vessel to said pressure-releasing vessel to feed said pressure-releasing vessel with ozonic water from said absorption vessel, and return duct means adapted to connect said pressure-releasing vessel with top of said absorption vessel.

8. An arrangement as set forth in claim 7, wherein said absorption vessel is designed as an absorption column.

9. An arrangement as set forth in claim 7, further comprising oxygen duct means and wherein said oxygen duct means and said drying means connect top of said absorption vessel with said ozone generator for recycling oxygen.

10. An arrangement as set forth in claim 7 to be used in a two-stage process and including a first adsorption vessel and a second absorption vessel, further comprising branch duct means leading from said flow-connection means to said first absorption vessel means, further duct means adapted to connect said branch duct means with said pressure-releasing vessel, and gas duct means adapted to connect said branch duct means with said second absorption vessel, said return duct means leading from said pressure-releasing vessel to top of said first absorption vessel, and said flow-connection means leading from said pressure-releasing vessel to said second absorption vessel.

11. An arrangement as set forth in claim 7 to be used in a three-stage process with three absorption vessels being in flow-connection with said ozone generator, further comprising first duct means provided between said ozone generator and one of said three absorption vessels, second duct means provided between said ozone generator and another of said three absorption vessels, a first pressure-releasing vessel provided in said first duct means, and a second pressure-releasing vessel provided in said second duct means.

* * * * *